(12) United States Patent
Yao et al.

(10) Patent No.: US 9,441,096 B2
(45) Date of Patent: Sep. 13, 2016

(54) RESIN COMPOSITION AND RESIN SHAPED PRODUCT

(71) Applicant: FUJI XEROX CO., LTD., Tokyo (JP)

(72) Inventors: Kenji Yao, Minamiashigara (JP); Masahiro Moriyama, Minamiashigara (JP); Manabu Kawashima, Minamiashigara (JP); Masaya Ikuno, Ebina (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 14/611,665

(22) Filed: Feb. 2, 2015

(65) Prior Publication Data

US 2016/0090471 A1 Mar. 31, 2016

(30) Foreign Application Priority Data

Sep. 26, 2014 (JP) ................. 2014-196845
Sep. 26, 2014 (JP) ................. 2014-196852
Sep. 26, 2014 (JP) ................. 2014-197375
Sep. 26, 2014 (JP) ................. 2014-197377
Sep. 26, 2014 (JP) ................. 2014-197378

(51) Int. Cl.
*C08L 1/10* (2006.01)
*C08K 5/10* (2006.01)
*C08L 31/04* (2006.01)
*C08L 1/12* (2006.01)
*C08L 1/14* (2006.01)

(52) U.S. Cl.
CPC . *C08L 1/10* (2013.01); *C08K 5/10* (2013.01); *C08L 1/12* (2013.01); *C08L 1/14* (2013.01); *C08L 31/04* (2013.01)

(58) Field of Classification Search
CPC ............ C08L 1/10; C08L 31/04; C08K 5/10
USPC ............................................. 524/37
See application file for complete search history.

(56) References Cited

U.S. PATENT DOCUMENTS

| | | | |
|---|---|---|---|
| 4,533,397 A * | 8/1985 | Wingler | C08L 1/10 514/162 |
| 5,281,691 A | 1/1994 | Hubbs et al. | |
| 6,037,384 A | 3/2000 | Kakizawa et al. | |
| 2011/0121245 A1 | 5/2011 | Negishi et al. | |

FOREIGN PATENT DOCUMENTS

JP  2012-052006 A  3/2012

OTHER PUBLICATIONS

Jul. 14, 2016 Office Action Issued in U.S. Appl. No. 15/140,810.
Jul. 14, 2016 Office Action Issued in U.S. Appl. No. 15/140,601.
Jul. 14, 2016 Office Action Issued in U.S. Appl. No. 15/140,966.
Jul. 14, 2016 Office Action issued in U.S. Appl. No. 15/140,873.
Kiuchi et al., "Improvement in Impact Strength of Modified Cardanol-Bonded Cellulose Thermoplastic Resin by Using Olefin Resins," Journal of Applied Polymer Science, 131, 39829, 2014.
Yin et al., "Melt Grafting of Poly(ethylene-vinyl acetate) Copolymer with Maleic Anhydride," Journal of Applied Polymer Science, 102, pp. 841-846, 2006.

* cited by examiner

*Primary Examiner* — Hui Chin
(74) *Attorney, Agent, or Firm* — Oliff PLC

(57) ABSTRACT

There is provided a resin composition which contains a cellulose ester resin, a polyether ester compound, and an additive if necessary, the resin composition being capable of providing a resin shaped product with excellent transparency, tensile fracture energy property, and the like, and of being suppressed from deterioration of flowability.

38 Claims, No Drawings

RESIN COMPOSITION AND RESIN SHAPED PRODUCT

CROSS-REFERENCE TO RELATED APPLICATION(S)

This application is based on and claims priority under 35 U.S.C. 119 from Japanese Patent Application Nos. 2014-197375 filed on Sep. 26, 2014, 2014-196845 filed on Sep. 26, 2014, 2014-196852 filed on Sep. 26, 2014, 2014-197378 filed on Sep. 26, 2014, and 2014-197377 filed on Sep. 26, 2014.

BACKGROUND

1. Technical Field

The present invention relates to a resin composition and a resin shaped product.

2. Related Art

Conventionally, various resin compositions containing a cellulose ester resin have been provided and used for manufacturing various resin shaped products.

SUMMARY

According to one aspect of the invention, there is provided a resin composition, including: a cellulose ester resin; and a polyether ester compound.

DETAILED DESCRIPTION

Hereinafter, an exemplary embodiment of the present invention will be described. The following explanation and examples are simply an example of the present invention and do not limit the scope of the present invention.

In a case for explaining an amount of each component in a composition, when a plurality of material is present in a component, the amount of the component means a sum of the plurality of materials unless otherwise mentioned.

<Resin Composition>

A resin composition of exemplary embodiments of the present invention contains a cellulose resin and a polyether ester compound. The resin composition of exemplary embodiments of the present invention contains the cellulose ester resin as the main component. The main component means a component having the largest content (by weight) among components contained in the resin composition.

Here, a resin shaped product made from a cellulose ester resin alone having, depending on a structure of a substituent contained therein, a high transparency, and for example, a total light transmittance of 85% or more and 88% or less in a film having a thickness of 2 mm, and being formed by cast molding or the like at a lower temperature of 30° C. or less. On contrary, in a case where a second component which has a different chemical structure from a cellulose resin is added to the cellulose resin, transparency is degraded. For example, a cast film having a thickness of 2 mm and being cast-molded by using triacetyl cellulose alone has a total light transmittance of 88%. When triphenyl phosphate, which is a general plasticizer, is added to the cast film at a ratio of 20% by weight, the total light transmittance is lowered to 85%.

Also, a cellulose ester resin generally has a high water absorption ability and a low water repellency due to presence of a hydroxyl group or an acyl group in a molecular structure. Thus, a pellet of a resin composition made from a cellulose ester resin alone and a resin shaped product formed by the cellulose ester resin has a low water repellency.

Further, the cellulose ester resin generally has a poor thermoplastic property since a melt viscosity is not lowered even when being heated. Thus, a resin composition made from the cellulose ester resin alone has a low flowability and poor moldability.

When a plasticizer having a good affinity with the cellulose ester resin and a low melt viscosity is blended with the cellulose ester resin, thermoplastic property is imparted. In the cellulose ester resin, although melt viscosity is lowered as an amount of the plasticizer is large, thermoplastic property is improved, that is flowability of the resin is enhanced. However, due to effects of temperature, humidity and time, a phenomenon (bleeding phenomenon) where the plasticizer is precipitated on the surface of a pellet of the resin composition and the resin shaped product is occurred in some cases. In the case of occurrence of this bleeding phenomenon, 1) deterioration in appearance of the resin shaped product, 2) adhesion of the plasticizer to a hand or the like when being in contact with the pellet of the resin composition or the resin shaped product, and 3) deterioration in mechanical strength of the resin shaped product, are occurred in some cases. Thus, moldability (thermoplastic property and flowability) and bleeding resistance have a trade-off relationship, and achievement of both thereof has been desired.

As mentioned above, the amount of the plasticizer is currently limited. In the limited amount of the plasticizer, a resin composition containing the cellulose ester resin does not have sufficient thermoplastic property (flowability), and a creaking noise from a screw of a molding machine is generated at molding in some case. A creaking noise at molding is a phenomenon occurred when the screw and the resin composition is rubbed by increasing rotational torque (plasticized torque) of the screw of the molding machine thermoplastic property (flowability) of the resin composition is low. Further, in the limited amount of the plasticizer, a resin shaped product obtained from the resin composition containing the cellulose resin has insufficient toughness, and steel ball drop strength of the resin shaped product is insufficient in some cases.

As a method of solving the above problems of the cellulose ester resin, in a case where a polyether ester compound is blended with a cellulose ester resin, transparency (total light transmittance) is improved compared to the case of using the cellulose ester resin alone. This reason has not been cleared, but the following reason may be assumed.

An ether portion and an alkylene group in an ester portion of the polyether ester compound have affinity with the cellulose ester resin, and thereby the terminal of the ester portion has a suitable free volume and an orientation of the cellulose ester resin is disturbed. Due to the affinity between of the polyether ester compound and the cellulose ester resin, intermolecular forces between the cellulose ester resin becomes low, a dispersion state of the polyether ester compound and the cellulose ester resin becomes substantially uniform, and thereby the mixture of the both components has a high isotropy.

In other words, by the affinity of the polyether ester compound and the cellulose ester resin, the both components are substantially uniformly dispersed and have a suitable steric hindrance, and therefore anisotropy in which a cellulose ester resin originally has tends not to be shown. Thus, a high tensile fracture energy may be developed.

In view of the above, the resin composition of exemplary embodiments of the present invention is capable of obtaining a resin shaped product being excellent in transparency and tensile fracture energy property by having the above configuration. The resin composition of exemplary embodiments of the present invention has a thermoplastic property (flowability) and a high moldability. It is considered that this is because an affinity between the cellulose resin and the polyether ester compound is high, and the both components are substantially uniformly dispersed, and thereby a high isotropy is obtained.

The resin composition of exemplary embodiments of the present invention may further contain an acrylonitrile-butadiene-styrene resin (hereinafter, referred to as ABS resin in some cases). By containing the ABS resin, there can be provided a resin composition capable of obtaining a resin shaped product having an excellent water repellency. This reason has not been cleared, but the following reason may be assumed.

When the ABS resin is blended to the system of the cellulose ester resin and the polyether ester compound, a portion of acrylonitrile structure of the ABS resin has affinity with a hydroxyl group of the cellulose ester resin and protects (blocks) the hydroxyl group. Further, the ABS resin having a high hydrophobicity is finely dispersed in a state of substantial uniform with the cellulose ester resin. Also, by finely dispersing the ABS resin, fine unevenness structure is formed at a surface of a pellet of a resin composition and a resin shaped product of the resin composition. This fine unevenness structure contributes to Lotus effect that a contact area with water becomes small, and the structure is one factor for developing an excellent water repellency.

Thus, by blending the ABS resin to the system of the cellulose ester resin and the polyether ester compound, there can be provided a resin composition capable of obtaining a resin shaped product having an excellent water repellency.

The resin composition of exemplary embodiments of the present invention may further contain a maleic anhydride-modified ethylene-vinyl acetate copolymer (referred to as "maleic anhydride-modified EVA resin"). By containing the maleic anhydride-modified EVA resin, there can be provided a resin composition capable of obtaining a resin shaped product having an excellent bleeding resistance, the resin composition having an excellent moldability. This reason has not been cleared, but the following reason may be assumed.

When the polyether ester compound is blended with the cellulose ester resin, as mentioned above, intermolecular forces of the cellulose ester resin are weaken to a suitable degree due to the high affinity and the molecular structure of the polyether ester compound, and thereby a thermoplastic property is enhanced. On contrary, when leaving the mixture at a high humidity environment for a long time, the polyether ester compound is hydrolyzed to lower weight molecular, and thereby a tendency of bleeding becomes high.

Here, when the maleic anhydride-modified EVA resin is blended to the system of the cellulose ester resin and the polyether ester compound, the maleic anhydride-modified EVA resin is substantially uniformly dispersed in the resin composition by reacting a maleic anhydride portion with a hydroxyl group of the cellulose ester resin. Furthermore, the maleic anhydride-modified EVA resin has a function of absorbing moisture in atmosphere and suppresses the polyether ester compound from being hydrolyzed. Thus, lowering weight molecular of the polyether ester compound is suppressed, and thereby occurrence of bleeding is suppressed.

Thus, by blending the maleic anhydride-modified EVA resin to the system of the cellulose ester resin and the polyether ester compound, there can be provided a resin composition capable of obtaining a resin shaped product having an excellent bleeding resistance, the resin composition having an excellent moldability.

The resin composition of exemplary embodiments of the present invention may further contain a polyhydroxyalkanoate resin. By containing the polyhydroxyalkanoate resin, there can be provided a resin composition capable of obtaining a resin shaped product having an excellent surface glossiness. This reason has not been cleared, but the following reason may be assumed.

When the polyhydroxyalkanoate resin is blended to the system of the cellulose ester resin and the polyether ester compound, the polyhydroxyalkanoate resin has a fine spherical structure due to repulsive forces from the cellulose ester resin. By dispersing the polyhydroxyalkanoate resin having the fine spherical structure in a substantially uniform state, glossiness is developed.

Thus, by blending the polyhydroxyalkanoate resin to the system of the cellulose ester resin and the polyether ester compound, there can be provided a resin composition capable of obtaining a resin shaped product having an excellent surface glossiness.

The resin composition of exemplary embodiments of the present invention may further contain a polyolefin resin. By containing the polyolefin resin, there can be provided a resin composition capable of obtaining a resin shaped product having an excellent steel ball drop strength, the resin composition being capable of suppressing the creaking noise generated from the screw of the molding machine at molding from being occurred. This reason has not been cleared, but the following reason may be assumed.

When the polyolefin resin having a low affinity with the cellulose resin is blended to the system of the cellulose ester resin and the polyether ester compound, the polyolefin resin penetrates a space between the molecules of the cellulose ester resin, and slipping at a surface between the polyolefin resin and the cellulose resin is occurred. This slipping contributes to thermoplastic property (flowability) of the resin composition, and thereby the plasticized torque of the screw of the molding machine is reduced.

Further, since the polyolefin resin penetrates the space between molecules of the cellulose ester resin, the can be provide a resin shaped product having a high toughness.

Thus, by blending the polyolefin resin to the system of the cellulose ester resin and the polyether ester compound, there can be provided a resin composition capable of obtaining a resin shaped product having an excellent steel ball drop strength, the resin composition being capable of suppressing the creaking noise generated from the screw of the molding machine at molding from being occurred.

In view of the above, the resin composition of exemplary embodiments of the present invention is capable of obtaining a resin shaped product being excellent in transparency and tensile fracture energy property by having the above configuration. The resin composition of exemplary embodiments of the present invention has a thermoplastic property (flowability) and a high moldability. It is considered that this is because an affinity between the cellulose resin and the polyether ester compound is high, and the both components are substantially uniformly dispersed, and thereby a high isotropy is obtained.

Hereinafter, components of the resin shaped product of exemplary embodiments of the present invention will be described.

[Cellulose Ester Resin]

The resin composition of exemplary embodiments of the present invention contains a cellulose ester resin. Examples of the cellulose ester resin include a cellulose ester resin represented by formula (1).

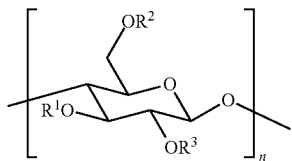

Formula (1)

In formula (1), $R^1$, $R^2$ and $R^3$ each independently represent a hydrogen atom or an acyl group having 1 to 3 carbon atoms. n represents an integer of 1 or more.

Examples of an acyl group represented by $R^1$, $R^2$ and $R^3$ include an acetyl group, a propionyl group, a butyryl group and the like. In terms of improvement of transparency and tensile fracture energy property of the resin shaped product, an acyl group is preferably an acetyl group.

In formula (1), a range of n is not particularly limited. However, the range is preferably 250 or more and 750 or less, and more preferably 350 or more and 600 or less. When n is 250 or more, a strength of the resin shaped product tends to be enhanced. When n is 750 or less, degradation of flexibility of the resin shaped product tends to be suppressed. Thus, when n falls within the range, tensile fracture energy property is further enhanced.

Here, the phrase "$R^1$, $R^2$ and $R^3$ each independently represent an acyl group" means that at least one portion of hydroxyl group in the cellulose ester resin represented by formula (1) is acylated.

That is, all $R^1$'s contained in the cellulose ester resin may be the same or different or a part of $R^1$'s contained in the cellulose ester resin may be the same. $R^2$'s and $A^3$'s are similar to $R^1$'s.

A substitution degree of the cellulose ester resin is preferably 2.1 or more and 2.6 or less, and more preferably 2.2 or more and 2.5 or less.

When the substitution degree is 2.6 or less, a crystallization of the cellulose ester resin may be suppressed, and thereby a thermoplastic property may be easily developed. Thus, when the substitution degree falls within the above range, transparency and tensile fracture energy property of the resin shaped product are further improved. Also, a moldability of the resin composition is further improved.

Meanwhile, the substitution degree is an index showing a degree of acylation of the cellulose ester resin. Specifically, the substitution degree means an average number of substitution of 3 hydroxyl group of a glucopyranose unit in the cellulose ester resin by an acyl group in a molecular.

Here, in terms of improvement of transparency and tensile fracture energy property of the resin shaped product, the cellulose ester resin preferably has an acetyl group as an acyl group in which $R^1$, $R^2$ and $R^3$ each independently represent and has a substitution degree of 2.1 or more and 2.6 or less.

A weight average molecular weight (Mw) of the cellulose ester resin is preferably 100,000 or more and 300,000 or less, and more preferably 150,000 or more and 200,000 or less, in terms of improvement of transparency and tensile fracture energy property of the resin shaped product. The weight average molecular weight may be measured in the same manner as in a method for measuring a weight average molecular weight of the polyether ester compound.

Hereinafter, specific examples of the cellulose ester resin will be shown, but the cellulose ester resin is not limited thereto.

TABLE 1

| No. | Name of Compound | Product Name | Manufacturer | Substitution $R^1$, $R^2$ and $R^3$ | Substitution Degree |
|-----|------------------|--------------|--------------|--------------------------------------|---------------------|
| CE1 | Compound 1 | diacethyl cellulose | L-50 | Daicel Corporation | hydrogen atom or acetyl group | 2.5 |
| CE2 | Compound 2 | diacethyl cellulose | L-20 | Daicel Corporation | hydrogen atom or acetyl group | 2.5 |
| CE3 | Compound 3 | diacethyl cellulose | L-50 reforming product | Daicel Corporation | hydrogen atom or acetyl group | 2.4 |
| CE4 | Compound 4 | diacethyl cellulose | L-50 reforming product | Daicel Corporation | hydrogen atom or acetyl group | 2.0 |
| CE5 | Compound 5 | diacethyl cellulose | L-20 reforming product | Daicel Corporation | hydrogen atom or acetyl group | 2.4 |
| CE6 | Compound 6 | cellulose triacetate | LT-55 | Daicel Corporation | hydrogen atom or acetyl group | 2.7 |
| CE7 | Compound 7 | cellulose acetate propionate | CAP482-20 | Eastman Chemical Company | hydrogen atom, acetyl group or propionyl group | 2.6 |
| CE8 | Compound 8 | cellulose acetate butylate | CAB381-0.1 | Eastman Chemical Company | hydrogen atom, acetyl group or propionyl group | 2.6 |

[Polyether Ester Compound]

The resin composition of exemplary embodiments of the present invention contains a polyether ester compound. Examples of the polyether ester compound include a polyether ester compound represented by formula (2).

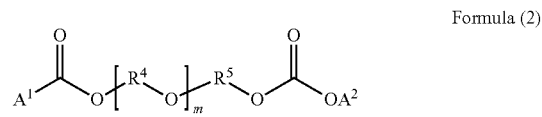

Formula (2)

In formula (2), $R^4$ and $R^5$ each independently represent an alkylene group having 2 to 10 carbon atoms. $A^1$ and $A^2$ each independently represent an alkyl group having 1 to 6 carbon atoms, an aryl group having 6 to 12 carbon atoms, or aralkyl group having 7 to 18 carbon atoms. m represents an integer of 1 or more.

In formula (2), an alkylene group represented by $R^4$ is preferably an alkylene group having 3 to 10 carbon atoms, and more preferably 3 to 6 carbon atoms. The alkylene group represented by $R^4$ may be a linear form, a branched form or a cyclic form. Among them, the linear form is preferable.

When the carbon number of the alkylene group represented by $R^4$ is 3 or more, deterioration of flowability of the resin composition may be suppressed, and thereby a plastic property is easily developed. When the carbon number of the alkylene group represented by $R^4$ is 10 or less, or the alkylene group represented by $R^4$ is a linear form, affinity with the cellulose ester resin tends to be enhanced. Thus, when the alkylene group represented by $R^4$ is a linear form, and the carbon number falls within the above range, transparency and tensile fracture energy property of the resin shaped product, particularly transparency, is further improved. Also, moldability of the resin composition is further improved.

In terms thereof, the alkylene group represented by $R^4$ is preferably n-hexylene group (—$(CH_2)_6$—). That is, the polyether ester compound is preferably a compound having n-hexylene group (—$(CH_2)_6$—) as $R^4$.

In formula (2), an alkylene group represented by $R^5$ is preferably an alkylene group having 3 to 10 carbon atoms, and more preferably 3 to 6 carbon atoms. The alkylene group represented by $R^4$ may be a linear form, a branched form or a cyclic form. Among them, the linear form is preferable.

When the carbon number of the alkylene group represented by $R^5$ is 3 or more, deterioration of flowability of the resin composition may be suppressed, and thereby a plastic property is easily developed. When the carbon number of the alkylene group represented by $R^5$ is 10 or less, or the alkylene group represented by $R^5$ is a linear form, affinity with the cellulose ester resin tends to be enhanced.

Thus, when the alkylene group represented by $R^5$ is a linear form, and the carbon number falls within the above range, transparency and tensile fracture energy property of the resin shaped product, particularly transparency, is further improved. Also, moldability of the resin composition is further improved.

In terms thereof, the alkylene group represented by $R^5$ is preferably n-butylene group (—$(CH_2)_4$—). That is, the polyether ester compound is preferably a compound having n-butylene group (—$(CH_2)_4$—) as $R^5$.

In formula (2), an alkyl group represented by $A^1$ and $A^2$ is preferably an alkyl group having 1 to 10 carbon atoms, and more preferably 2 to 8 carbon atoms. The alkyl group represented by $A^1$ and $A^2$ may be a linear form, a branched form or a cyclic form. Among them, the branced form is preferable.

Examples of the alkyl group represented by $A^1$ and $A^2$ include an unsubstituted aryl group such as a phenyl group and a naphthyl group, and a substituted phenyl group such as a methyl phenyl group and t-butyl phenyl group.

The aralkyl group represented by $A^1$ and $A^2$ is a group represented by —$R^4$-Ph. $R^4$ represents a linear or branched alkylene group having 1 to 6 carbon atoms (preferably 2 to 4 carbon atoms). Ph represents an unsubstituted phenyl group, or a substituted phenyl group by a linear or branched alkyl group having 1 to 6 carbon atoms (preferably 2 to 6 carbon atoms). Examples of the aralkyl group include an unsubstituted aralkyl group such as a benzyl group, a phenyl methyl group (phenethyl group), a phenyl propyl group, and a phenyl butyl group, and a substituted aralkyl group such as a methyl benzyl group, a dimethyl benzyl group, and a methyl phenethyl group.

At least one of $A^1$ and $A^2$ is preferably an aryl group or an aralkyl group. That is, the polyether ester compound is preferably a compound in which at least one of $A^1$ and $A^2$ is an aryl group (preferably phenyl group) or an aralkyl group, more preferably a compound in which both of $A^1$ and $A^2$ is an aryl group (preferably phenyl group) or an aralkyl group, and further more preferably a compound in which both $A^1$ and $A^2$ is an aryl group (preferably phenyl group). The polyether ester compound is preferably a compound in which at least one of $A^1$ and $A^2$ is an aryl group (preferably phenyl group) or an aralkyl group tends to generate a suitable space between molecular of the cellulose ester resin, and may be suppressed the cellulose from being crystallized.

Thus, transparency and tensile fracture energy property of the resin shaped product, particularly tensile fracture energy property, are further improved. Also, moldability of the resin composition is further improved.

In formula (2), a range of m is not particularly limited, but the range is preferably 1 to 5, and for example, 1 to 3.

When m is 1 or more, the polyether ester compound is difficult to be precipitated. When m is 5 or less, an affinity with the cellulose ester resin tends to be enhanced. Thus, when m falls within the above range, transparency and tensile fracture energy property of the resin shaped product, particularly tensile fracture energy property, are further improved. Also, moldability of the resin composition is further improved.

Next, properties of the polyether ester compound will be described.

A weight average molecular weight (Mw) of the polyether ester compound is preferably 450 to 650, and more preferably 500 to 600.

When the weight average molecular weight (Mw) is 450 or more, it is difficult to cause bleeding (precipitation). When the weight average molecular weight (Mw) is 650 or less, an affinity with the cellulose ester resin tends to be enhanced. Thus, the weight average molecular weight (Mw) falls within the above range, transparency and tensile fracture energy property of the resin shaped product, particularly tensile fracture energy property, are further improved. Also, moldability of the resin composition is further improved.

Meanwhile a weight average molecular weight (Mw) is measured by gel permeation chromatography (GPC). Specifically, a molecular weight measurement by GPC may be conducted in a chloroform medium by using HPLC 1100 manufactured by TOSOH CORPORATION as a measurement apparatus and TSKgel GMHHR-M+T SKgel GMHHR-M (7.8 mm I.D. 30 cm), which is a column manufactured by TOSOH CORPORATION. A weight average molecular weight is calculated from the measurement result by using a calibration curve obtained by monodisperse polystyrene reference sample A viscosity of the polyether ester compound at 25° C. is preferable 35 mPa·s or more and 50 mPa·s or less, and more preferably 40 mPa·s or more and 45 mPa·s or less.

When the viscosity is 35 mPa·s or more, dispersibility to the cellulose ester resin tends to be enhanced. When the viscosity is 50 mPa·s or less, dispersion anisotropy of the polyether ester compound is difficult to be developed. Thus, when the viscosity falls within the above range, transparency and tensile fracture energy property of the resin shaped product, particularly tensile fracture energy property, are further improved. Also, moldability of the resin composition is further improved.

Meanwhile a viscosity may be measured with an E-type viscometer.

Hazen color number (APHA) of the polyether ester compound is preferably 100 to 140, and more preferably 100 to 120.

When Hazen color number (APHA) is 100 or more, a difference of refractive index from the cellulose ester resin is small, and it is difficult to cause a phenomenon where the resin shaped product is made muddy whitish in color. When Hazen color number (APHA) is 140 or less, it is difficult that the resin shaped product becomes yellowish in color. Thus, when Hazen color number falls within the above range, transparency of the resin shaped product is further improved.

Hazen color number (APHA) may be measured in accordance with JIS K 0071-1 (1998).

A solubility parameter (SP value) of the polyether ester compound is preferably 9.5 to 9.9, and more preferably 9.6 to 9.8.

When the solubility parameter (SP value) is 9.5 to 9.9, dispersibility to the cellulose ester resin tends to be enhanced. Thus, when the solubility parameter falls within the above range, transparency and tensile fracture energy property of the resin shaped product, particularly tensile fracture energy property, are further improved. Also, moldability of the resin composition is further improved.

A solubility parameter is calculated by a method of Fedor. Specifically, the solubility parameter is calculated from the following equation in accordance with the method described in "Polym. Eng. Sci., vol. 14, p. 147 (1974)".

$$SP\ value = \sqrt{(Ev/v)} = \sqrt{(\Sigma \Delta ei/\Sigma \Delta vi)}$$

In equation, Ev represents evaporation energy (cal/mol), v represents a molar volumet (cm$^3$/mol), $\Delta ei$ represents evaporation energy of respective atoms or respective atom groups, and $\Delta vi$ represents a molar volume.

Meanwhile, a solubility parameter (SP value) is represented by using (cal/cm$^3$)$^{1/2}$ as a unit, but according to conventional practice, such an unit is omitted and the SP value is represented as a dimensionless value.

Here, in terms of particularly improvement of transparency and tensile fracture energy property, the polyether ester compound is preferably a compound in which R$^5$ is a n-butylene group, at least one of A$^1$ and A$^2$ is an aryl group or an aralkyl group, and a weight average molecular weight (Mw) is 450 to 650.

Also, in terms of the same aspect, the polyether ester compounds is preferably a compound in which a viscosity at 25° C. is 35 mPa·s or more and 50 mPa·s or less, Hazen color number (APHA) is 100 to 140, and a solubility parameter (SP value) is 9.5 to 9.9.

Hereinafter, specific examples of the polyether ester compound will be shown, but the polyether ester compound is not limited thereto.

The content of acrylonitrile in the ABS resin is preferably 10% by mass to 60% by mass, and the content of butadiene in the ABS resin is preferably 5% by mass to 30% by mass. In the case where the contents of components in the ABS resin fall within the above range, there can be provided a resin composition capable of obtaining a resin shaped product having an excellent water repellency.

Melt flow rate (MFR) of the ABS resin is preferably 10 g/10 min to 30 g/10 min, and more preferably 15 g/10 min to 25 g/10 min.

When melt flow rate (MFR) of the ABS resin is 10 g/10 min or more, dispersibility thereof to the cellulose ester resin tends to be enhanced. When melt flow rate (MFR) of the ABS resin is 30 g/10 min or less, affinity thereof with the cellulose ester resin tends to be enhanced. Accordingly, when the melt flow rate (MFR) of the ABS resin falls within the above range, water repellency of the resin shaped product is further improved. Also, moldability of the resin composition is further improved.

The melt flow rate (MFR) of the ABS resin may be measured by using a melt indexer (G-01, manufactured by TOYO SEIKI SEISAKU-SHO, LTD.) at a temperature of 230° C. and a load of 21.2 N.

Hereinafter, specific examples of the ABS resin will be shown, but the ABS resin is not limited thereto.

| No. | Product Name | Manufacturer | MFR (g/10 min) |
|---|---|---|---|
| ABS 1 | Compound 30 | TOYOLAC 700-314 | TORAY INDUSTRIES, INC. | 23 |
| ABS 2 | Compound 31 | TOYOLAC 100-322 | TORAY INDUSTRIES | 15 |
| ABS 3 | Compound 32 | TOYOLAC 250-X10 | TORAY INDUSTRIES | 48 |
| ABS 4 | Compound 33 | TOYOLAC 300-225 | TORAY INDUSTRIES | 9 |

| No. | | R$^4$ | R$^5$ | A$^1$ | A$^2$ | Mw | Viscosity (at 25° C.) | APHA | SP Value |
|---|---|---|---|---|---|---|---|---|---|
| PEE1 | Compound 9 | —(CH$_2$)$_6$— | —(CH$_2$)$_4$— | phenyl group | phenyl group | 550 | 43 | 120 | 9.7 |
| PEE 2 | Compound 10 | —(CH$_2$)$_2$— | —(CH$_2$)$_4$— | phenyl group | phenyl group | 570 | 44 | 115 | 9.4 |
| PEE 3 | Compound 11 | —(CH$_2$)$_{10}$— | —(CH$_2$)$_4$— | phenyl group | phenyl group | 520 | 48 | 110 | 10.0 |
| PEE 4 | Compound 12 | —(CH$_2$)$_6$— | —(CH$_2$)$_2$— | phenyl group | phenyl group | 550 | 43 | 115 | 9.3 |
| PEE 5 | Compound 13 | —(CH$_2$)$_6$— | —(CH$_2$)$_{10}$— | phenyl group | phenyl group | 540 | 45 | 115 | 10.1 |
| PEE 6 | Compound 14 | —(CH$_2$)$_6$— | —(CH$_2$)$_4$— | t-butyl group | t-butyl group | 520 | 44 | 130 | 9.7 |
| PEE 7 | Compound 15 | —(CH$_2$)$_6$— | —(CH$_2$)$_4$— | phenyl group | phenyl group | 460 | 45 | 125 | 9.7 |
| PEE 8 | Compound 16 | —(CH$_2$)$_6$— | —(CH$_2$)$_4$— | phenyl group | phenyl group | 630 | 40 | 120 | 9.7 |
| PEE 9 | Compound 17 | —(CH$_2$)$_6$— | —(CH$_2$)$_4$— | phenyl group | phenyl group | 420 | 43 | 135 | 9.7 |
| PEE 10 | Compound 18 | —(CH$_2$)$_6$— | —(CH$_2$)$_4$— | phenyl group | phenyl group | 670 | 48 | 105 | 9.7 |
| PEE 11 | Compound 19 | —(CH$_2$)$_6$— | —(CH$_2$)$_4$— | phenyl group | phenyl group | 550 | 35 | 130 | 9.7 |
| PEE 12 | Compound 20 | —(CH$_2$)$_6$— | —(CH$_2$)$_4$— | phenyl group | phenyl group | 550 | 49 | 125 | 9.7 |
| PEE 13 | Compound 21 | —(CH$_2$)$_6$— | —(CH$_2$)$_4$— | phenyl group | phenyl group | 550 | 32 | 120 | 9.7 |
| PEE 14 | Compound 22 | —(CH$_2$)$_6$— | —(CH$_2$)$_4$— | phenyl group | phenyl group | 550 | 53 | 105 | 9.7 |
| PEE 15 | Compound 23 | —(CH$_2$)$_6$— | —(CH$_2$)$_4$— | phenyl group | phenyl group | 550 | 43 | 135 | 9.7 |
| PEE 16 | Compound 24 | —(CH$_2$)$_6$— | —(CH$_2$)$_4$— | phenyl group | phenyl group | 550 | 43 | 105 | 9.7 |
| PEE 17 | Compound 25 | —(CH$_2$)$_6$— | —(CH$_2$)$_4$— | phenyl group | phenyl group | 550 | 43 | 150 | 9.7 |
| PEE 18 | Compound 26 | —(CH$_2$)$_6$— | —(CH$_2$)$_4$— | phenyl group | phenyl group | 550 | 43 | 95 | 9.7 |

[ABS Resin]

The resin composition of exemplary embodiments of the present invention may further contain an ABS resin (acrylonitrile-butadiene-styrene copolymer).

The ABS resin may be an ABS resin produced by a graft method or an ABS resin produced by a polymer-blend method.

-continued

| No. | Product Name | Manufacturer | MFR (g/10 min) |
|---|---|---|---|
| ABS 5 | Compound 34 | Cevian V500 | Daicel Polymer Ltd. | 11 |

[Maleic Anhydride-Modified Ethylene-Vinyl Acetate Copolymer]

The resin composition of exemplary embodiments of the present invention may further contain a maleic anhydride-modified EVA resin (maleic anhydride-modified ethylene-vinyl acetate copolymer).

The maleic anhydride-modified EVA resin is an ethylene-vinyl acetate copolymer graft-modified by a maleic anhydride. The maleic anhydride-modified EVA resin may be obtained by, for example, grafting a maleic anhydride on the ethylene-vinyl acetate copolymer and using organic peroxides or a radical generated by thermal decomposition method or the like as a starting material.

The maleic anhydride-modified EVA resin preferably has a density of 0.9 to 0.94 and a melting point of 90° C. to 100° C., and more preferably a density of 0.91 to 0.93 and a melting point of 92° C. to 98° C.

When the density of the resin is 0.9 to 0.94 and the melting point is 90° C. to 100° C., reactivity of the maleic anhydride-modified EVA resin to a hydroxyl group of the cellulose ester resin tends to be enhanced. Also, lowering in flowability of the resin composition is suppressed, and thereby thermoplastic property tends to be developed. Accordingly, when the density and the melting point of the maleic anhydride-modified EVA resin fall within the above range, moldability of the resin composition and bleeding resistance of the resin shaped product are further improved.

The density of the maleic anhydride-modified EVA resin may be measured by the hydrometry in accordance with JIS K 0061 (2001). The melting point of the maleic anhydride-modified EVA resin may be measured by the method in accordance with JIS K 7121 (2012).

Hereinafter, specific examples of the maleic anhydride-modified EVA resin will be shown, but the maleic anhydride-modified EVA resin is not limited thereto.

| No. | Product Name | Manufacturer | Density | Melting Point (° C.) |
| --- | --- | --- | --- | --- |
| EVA 1 | Compound 35 | MODIC A543 | Mitsubishi Chemical Corporation | 0.92 | 98 |
| EVA 2 | Compound 36 | MODIC A515 | Mitsubishi Chemical Corporation | 0.95 | 88 |

[Polyhydroxyalkanoate Resin]

The resin composition of exemplary embodiments of the present invention may further contain a polyhydroxyalkanoate resin. Examples of the polyhydroxyalkanoate resin include a polyhydroxyalkanoate resin represented by formula (3).

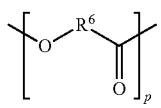

Here, $R^6$ represents an alkylene group having 1 to 10 carbon atoms, and p represents and integer of 1 or more.

The alkylene group represented by $R^6$ is preferably an alkylene group having 3 to 6 carbon atoms. The alkylene group represented by $R^6$ may be a linear form or a branched form, but is preferably a branched form in terms of improvement of surface glossiness of the resin shaped product and moldability of the resin composition.

In formula (3), a range of p is not particularly limited, but is preferably 10 to 2000, and more preferably 50 to 1000. When p falls within the range of 10 to 2000, surface glossiness of the resin shaped product is further improved. Further, moldability of the resin composition is further improved.

Here, "$R^6$ represent an alkylene group in formula (3)" means 1) that formula (3) includes the same [O—$R^6$—C(=O)—] structure in which $R^6$'s are the same or 2) that formula (3) includes a plurality of [O—$R^6$—C(=O)—] structure in which $R^6$'s are different in carbon number or branched state.

That is, the polyhydroxyalkanoate resin may be a polymer in which one kind of hydroxyalkanoate (hydroxyalkanoic acid) is singly polymerized or may be a copolymer in which two or more kinds of hydroxyalkanoate (hydroxyalkanoic acid) are copolymerized.

Examples of hydroxyalkanoic acid for forming the polyhydroxyalkanoate resin include a lactic acid, 2-hydroxybutyric acid, 3-hydroxybutyric acid, 4-hydroxybutyric acid, 2-hydroxy-3-methyl-butyric acid, 2-hydroxy-3,3-dimethyl-butyric acid, 3-hydroxyvaleric acid, 4-hydroxy valeric acid, 5-hydroxy valeric acid, 3-hydroxyhexanoic acid, 2-hydroxycaproic acid, 2-hidroxyisocapoic acid, 6-hydroxycapoic acid, 3-hydroxypropionic acid, 3-hydroxy-2,2-dimethylpropionic acid and 2-hydroxy-n-octanoic acid.

Of these, the polyhydroxyalkanoate resin is preferably a copolymer resin of a branched hydroxyalkanoic acid having 2 to 4 carbon atoms and a branched hydroxylalkanoic acid having 5 to 7 carbon atoms (the carbon number includes a carbon atom contained in a carboxyl group), and more preferably a copolymer resin of 3-hydroxybutyric acid and 3-hydroxycaproic acid (copolymer resin of 3-hydroxybutylate and 3-hydroxyhexanoate). In the case of using this copolymer resin, the polyhydroxyalkanoate resin easily form a fine spherical structure, and surface glossiness of the resin shaped product is further improved. Also, moldability of the resin composition is further improved.

The weight average molecular weight (Mw) of the polyhydroxyalkanoate resin is preferably 10,000 to 500,000, and more preferably 30,000 to 200,000.

When the weight average molecular weight (Mw) falls within the range of 10,000 to 500,000, surface glossiness of the resin shaped product is further improved. Also, moldability of the resin composition is further improved. The weight average molecular weight (Mw) may be measured in the same manner as in the method for measuring the weight average molecular weight of the polyether ester compound.

Hereinafter, specific examples of the polyhydroxyalkanoate resin will be shown, but the polyhydroxyalkanoate resin is not limited thereto.

| No. | Compound Name | Product Name | Manufacturer | $R^6$ |
|---|---|---|---|---|
| PHA1 | Compound 37 | Copolymer of 3-hydroxy butyric acid and 3-hydroxycaproic acid | AONILEX | Kaneka Corporation | Propylene group/ pentylene group $[O(C_3H_6)CO]/$ $[O(C_5H_6)CO]$ (Mass ratio = 90/10) |
| PHA 2 | Compound 38 | Polylactic acid | TERRAMAC TE 2000 | UNITIKA LTD. | Methylene group |
| PHA 3 | Compound 39 | Copolymer of 3-hydroxy butyric acid and 3-hydroxyvaleric acid | BIOPOL 3000 | Monsanto Company | Propylene group/ butylene group $[O(C_3H_6)CO]/$ $[O(C_4H_8)CO]$ (Mass ratio = 80/20) |

[Polyolefin Resin]

The resin composition of exemplary embodiments of the present invention may further contain a polyolefin resin.

The polyolefin resin may be a polymer of one kind of olefin or may be a copolymer of two kinds of olefin. The olefin may be a linear or branched aliphatic olefin or may be a alicyclic olefin.

The linear or branched aliphatic olefin may be an aliphatic olefin having 2 to 18 carbon atoms (preferably 2 to 12 carbon atoms), and examples thereof include α-olefin such as ethylene, propylene, 1-butene, 1-hexene, 4-methyl-1-pentene, 1-octene, 1-decene, 1-hexadecene, 1-octadecene.

The alicyclic olefin may be an alicyclic olefin having 4 to 8 carbon atoms (preferably 4 to 6 carbon atoms), and examples thereof include cyclopentene, cycloheptene, norbornene, 5-methyl-2-norbornene, tetracyclododecene, vinylcyclohexane, and the like.

Of these, the polyolefin is preferably an aliphatic olefin having 2 to 6 carbon atoms in terms of suppression of creaking noise of the resin composition at molding and improvement of steel ball drop strength of the resin shaped product.

The weight average molecular weight (Mw) of the polyolefin resin is preferably 20,000 or more and less than 150,000, and more preferably 30,000 or more and 50,000 or less. When the weight average molecular weight (Mw) is 20,000 or more and less than 150,000, creaking noise of the resin composition at molding is further suppressed, and steel ball drop strength of the resin shaped product is further improved.

The weight average molecular weight may be measured in the same manner as in the method for measuring the weight average molecular weight of the polyether ester compound.

Hereinafter, specific examples of the polyolefin resin will be shown, but the polyolefin resin is not limited thereto.

| No. | Compound Name | Product Name | Manufacturer | Mw |
|---|---|---|---|---|
| PO 1 | Compound 40 | Polyethylene | SGF 4960 | Braskem S.A. | 144000 |
| PO 2 | Compound 41 | Polyethylene | SHA 7260 | Braskem S.A. | 47700 |
| PO 3 | Compound 42 | Polypropylene | NOVATEC BC8 | Japan Poly-Propylene Corporation | 105000 |

[Amount of Cellulose Ester Resin and Polyether Ester Compound]

A mass ratio of the cellulose ester resin to the polyether ester compound (cellulose ester resin/polyether ester compound) is preferably 100/25 to 100/5, and more preferably 100/20 to 100/9.

When the mass ratio is 100/25 or more, the polyether ester compound is difficult to be precipitated. When the mass ratio is 100/5 or less, anisotropy of dispersion state of the cellulose ester disappears and isotropy becomes large, and thereby intermolecular forces of the cellulose ester resins are weaken. Also, deterioration of flowability of the resin composition is suppressed. Thereby, a thermoplastic property tends to be developed. Thus, the mass ratio falls within the above range, transparency and tensile fracture energy property of the resin shaped product, particularly tensile fracture energy property, are further improved. Also, water repellency, bleeding resistance, surface glossiness and steel ball drop strength of the resin shaped product, and moldability of the resin composition, are further improved, and creaking noise of the resin composition at molding is further suppressed. Also, moldability of the resin composition is further improved.

In the case where the ABS resin is contained in the system of the cellulose ester resin and the polyether ester compound, a mass ratio of the cellulose ester to the ABS resin is preferably 100/8 to 100/2, and more preferably 100/5 to 100/2.

When the mass ratio is 100/8 or more, dispersibility of the ABS resin is enhanced. When the mass ratio is 100/2 or less, a protective function of the ABS resin for protecting a hydroxyl group of the cellulose ester compound is enhanced. Thus, when the mass ratio falls within the above range, water repellency of the resin shaped product is further improved.

In the case where the maleic anhydride-modified EVA resin is contained in the system of the cellulose ester resin and the polyether ester compound, a mass ratio of the cellulose ester to the maleic anhydride-modified EVA resin is preferably 100/8 to 100/2, and more preferably 100/6 to 100/2.

When the mass ratio is 100/8 or more, lowering in flowability of the resin composition is suppressed, and thereby thermoplastic property tends to be developed. When the mass ratio is 100/2 or less, the polyether ester compound is difficult to be precipitated. Thus, when the mass ratio falls within the above range, moldability of the resin composition and bleeding resistance of the resin shaped product are further improved.

In the case where the polydydroxyalkanoate resin is contained in the system of the cellulose ester resin and the polyether ester compound, a mass ratio of the cellulose ester to the polydydroxyalkanoate resin is preferably 100/8 to 100/2, and more preferably 100/5 to 100/2.

When the mass ratio falls within the range of 100/8 to 100/2, surface glossiness of the resin shaped product is further improved. Also, moldability of the resin composition is further improved.

In the case where the polyolefin resin is contained in the system of the cellulose ester resin and the polyether ester compound, a mass ratio of the cellulose ester to the polyolefin resin is preferably 100/8 to 100/2, and more preferably 100/5 to 100/3.

When the mass ratio is 100/8 or more, steel ball drop strength tends to be enhanced. When the mass ratio is 100/2 or less, creaking noise of the resin composition at molding tends to be suppressed. Thus, when the mass ratio falls within the above range, creaking noise of the resin composition at molding is further suppressed, and steel ball drop strength of the resin shaped product is further improved. Also, moldability of the resin shaped product is further improved.

A mass ratio of the cellulose ester resin to the total resin composition is preferably 50% by mass to 95% by mass, and more preferably 60% by mass to 90% by mass.

[Other Components]

The resin composition of exemplary embodiments of the present invention may contain other components than the above components, depending on necessity. Examples of the other components include a flame retardant, a compatibilizer, a plasticizer, an antioxidant, a release agent, a light fastness improver, a weathering agent, a coloring agent, a pigment, a reforming agent, a dripping inhibitor, an antistatic agent, a hydrolysis inhibitor, a filler, a reinforcing agent (a glass fiber, a carbon fiber, a talc, a clay, a mica, a glass flake, a milled glass, a glass beads, a crystalline silica, an alumina, a silicon nitride, an alumina nitride, a boron nitride, and the like), and the like. An amount of the other components is 0% by mass to 5% by mass per the entire mass of the resin composition. Here, "0% by mass" means that the other components are not contained in the resin composition.

The resin composition of exemplary embodiments of the present invention may contain a resin other than the above resin. However, an amount of the resin other than the above is preferably contained in an amount of 5% by mass per the total mass of the resin in the resin composition. Examples of such a resin include conventionally known thermoplastic resins, specifically: a polycarbonate resin; a polypropylene resin; a polyester resin; a polyolefin resin; a polyester carbonate resin; a polyphenylene ether resin; a polyphenylene sulfide resin; a polysulfone resin; a polyether sulfone resin; a polyarylene resin; a polyether imide resin; a polyacetal resin; a polyvinyl acetal resin; a polyketone resin; a polyetherketone resin; a polyetheretherketone resin; a polyarylketone resin; a polyether nitrile resin; a liquid crystalline resin; a polybenzimidazole resin; a polyparabanic acid resin; a vinyl based polymer or a copolymer resin obtained by polymerizing or copolymerizing one or more kind of a vinyl monomer selected from the group consisting of an aromatic alkenyl compound, a methacrylic acid ester, an acrylic acid ester, and a vinyl cyanide compound; a vinyl cyanide/diene/aromatic alkenyl compound copolymer resin, an aromatic alkenyl compound/diene/vinyl cyanide/N-phenylmaleimide copolymer resin, a vinyl cyanide/(ethylene-diene-propylene (EPDM))/aromatic alkenyl compound copolymer resin, a vinyl chloride resin, a chlorinated vinyl chloride resin, and the like. These resins may be used alone or may be used in combination.

[Preparation Method of Resin Composition]

The resin composition of exemplary embodiments of the present invention is prepared by, for example, melting and kneading a mixture of the above components. Separately, the resin composition of exemplary embodiments of the present invention is prepared by dissolving the above components to a solvent. As a melting and kneading method, conventional methods are exemplified. Specifically, a method in which a twin screw extruder, a Henschel mixer, a Bumbary mixer, a single screw extruder, a multiscrew extruder, and a Cokneader, or the like is used is exemplified.

[Resin Shaped Product]

The resin shaped product of exemplary embodiments of the present invention contains the resin composition of exemplary embodiments of the present invention. That is, the resin shaped product of exemplary embodiments of the present invention has the same configuration as the resin composition.

Specifically, the resin shaped product may be obtained by forming the resin composition of exemplary embodiments of the present invention. As a forming method, injection molding, extrusion molding, blow molding, hot press forming, coating forming, casting molding, dipping molding, vaccum forming, transfer molding, or the like may be adopted.

The forming method of the resin shaped product of exemplary embodiments of the present invention is preferably injection molding in terms of high freedom degree in shape. Particularly, in order to obtain a resin shaped product being excellent in transparency and tensile fracture energy property by utilizing moldability (thermoplastic property and flowability) of the resin composition of exemplary embodiments of the present invention, injection molding is preferable. A cylinder temperature in injection molding is, for example, 200° C. to 250° C., and preferably 210° C. to 230° C. A mold temperature in injection molding is, for example, 40° C. to 60° C., and preferably 45° C. to 55° C. Injection molding may be conducted by using a commercially available apparatus such as NEX 150 manufactured by NISSEI PLASTIC INDUSTRIAL CO., LTD, NEX 70000 manufactured by NISSEI PLASTIC INDUSTRIAL CO., LTD, and SE50D manufactured by TOSHIBA MACHINE CO., LTD.

The resin shaped product of exemplary embodiments of the present invention is suitable used for electronic/electrical equipments, office automation equipments, home appliances, automotive interior materials, containers, and the like. More specifically, casing of electronic/electrical equipments or home appliances, various parts of electronic/electrical equipments or home appliances, storage cases of CD-ROM, DVD, or the like, tableware, beverage bottles, wrap films, films, sheets, and the like is exemplified.

EXAMPLE

Hereinafter, the present exemplary embodiment will be described in detail based on Examples, but the invention is not limited to these Examples below.

Further, "parts" indicates "parts by mass" unless otherwise noted.

Examples 1 to 31 and Comparative Examples 1 to 14

[Kneading]

Materials having components shown in Tables 1 and 2 are placed in a twin screw kneader (TEX41SS, manufactured by TOSHIBA MACHINE CO., LTD) and kneaded at a cylinder temperature of 220° C. to 250° C. to obtain a pellet of a resin composition (hereinafter, referred to as "resin pellet"). Meanwhile, in Tables 1 and 2, "parts" means "parts by mass".

[Injection Molding]

The obtained pellet is placed in an injection molding machine (PNX 40, manufactured by NISSEI PLASTIC INDUSTRIAL CO., LTD) and injection-molded at a cylinder temperature of 220° C. to 250° C. and a mold temperature of 40° C. to 60° C. to obtain ISO multi-purpose dumbbell test specimens (length for the test portion is 100 mm, width for the test portion is 10 mm, and a thickness of 4 mm) and D2 shaped product (length of 60 mm, width 60 mm, and thickness of 2 mm).

The each test specimen obtained is evaluated as follows. The results are shown in Tables 1 and 2.

Transparency

Total light transmittance of the D2 test specimens are measured by using a Haze meter (MH-150, manufactured by MURAKAMI COLOR RESEARCH LABORATORY CO., LTD.) in accordance with JIS K 7375 to evaluate transparency.

Tensile Fracture Energy

Tensile test of the ISO multi-purpose dumbbell test specimens by using an autograph (AG 10N-Xplus, manufactured by Shimadzu Corporation) in accordance with ISO 527 is conducted, and tensile fracture energy is calculated from an area of S-S curve.

TABLE 1

| | Components | | | | | | Transparency (Total light transmittance) (%) | Tensile Fracture Energy (J) |
|---|---|---|---|---|---|---|---|---|
| | Cellulose ester resin | | Polyether ester compound | | Other additives | | | |
| | Kind | Part | Kind | Part | Kind | Part | | |
| Ex. 1 | Compound 1 | 100 | Compound 9 | 15 | | | 93 | 24 |
| Ex. 2 | Compound 1 | 100 | Compound 9 | 10 | | | 93 | 23 |
| Ex. 3 | Compound 1 | 100 | Compound 9 | 20 | | | 92 | 24 |
| Ex. 4 | Compound 1 | 100 | Compound 9 | 25 | | | 91 | 24 |
| Ex. 5 | Compound 1 | 100 | Compound 9 | 5 | | | 92 | 23 |
| Ex. 6 | Compound 1 | 100 | Compound 9 | 27 | | | 89 | 15 |
| Ex. 7 | Compound 1 | 100 | Compound 9 | 4 | | | 89 | 22 |
| Ex. 8 | Compound 2 | 100 | Compound 9 | 15 | | | 93 | 24 |
| Ex. 9 | Compound 3 | 100 | Compound 9 | 15 | | | 92 | 23 |
| Ex. 10 | Compound 4 | 100 | Compound 9 | 15 | | | 89 | 16 |
| Ex. 11 | Compound 5 | 100 | Compound 9 | 15 | | | 93 | 23 |
| Ex. 12 | Compound 6 | 100 | Compound 9 | 15 | | | 89 | 15 |
| Ex. 13 | Compound 7 | 100 | Compound 9 | 15 | | | 93 | 24 |
| Ex. 14 | Compound 8 | 100 | Compound 9 | 15 | | | 92 | 23 |
| Ex. 15 | Compound 1 | 100 | Compound 10 | 15 | | | 85 | 15 |
| Ex. 16 | Compound 1 | 100 | Compound 11 | 15 | | | 85 | 14 |
| Ex. 17 | Compound 1 | 100 | Compound 12 | 15 | | | 88 | 16 |
| Ex. 18 | Compound 1 | 100 | Compound 13 | 15 | | | 89 | 17 |
| Ex. 19 | Compound 1 | 100 | Compound 14 | 15 | | | 86 | 17 |
| Ex. 20 | Compound 1 | 100 | Compound 15 | 15 | | | 92 | 24 |
| Ex. 21 | Compound 1 | 100 | Compound 16 | 15 | | | 93 | 24 |
| Ex. 22 | Compound 1 | 100 | Compound 17 | 15 | | | 86 | 17 |
| Ex. 23 | Compound 1 | 100 | Compound 18 | 15 | | | 88 | 15 |
| Ex. 24 | Compound 1 | 100 | Compound 19 | 15 | | | 93 | 23 |
| Ex. 25 | Compound 1 | 100 | Compound 20 | 15 | | | 93 | 24 |
| Ex. 26 | Compound 1 | 100 | Compound 21 | 15 | | | 87 | 18 |
| Ex. 27 | Compound 1 | 100 | Compound 22 | 15 | | | 88 | 16 |
| Ex. 28 | Compound 1 | 100 | Compound 23 | 15 | | | 92 | 24 |
| Ex. 29 | Compound 1 | 100 | Compound 24 | 15 | | | 92 | 23 |
| Ex. 30 | Compound 1 | 100 | Compound 25 | 15 | | | 85 | 18 |
| Ex. 31 | Compound 1 | 100 | Compound 26 | 15 | | | 87 | 19 |

TABLE 2

| | Components | | | | | | Transparency (Total light transmittance) (%) | Tensile Fracture Energy (J) |
|---|---|---|---|---|---|---|---|---|
| | Cellulose ester resin | | Polyether ester compound | | Other additives | | | |
| | Kind | Part | Kind | Part | Kind | Part | | |
| Comp. Ex. 1 | Compound 1 | 100 | | | Compound 27 | 15 | 77 | 9 |
| Comp. Ex. 2 | Compound 1 | 100 | | | Compound 28 | 15 | 76 | 6 |
| Comp. Ex. 3 | Compound 1 | 100 | | | Compound 29 | 15 | 79 | 7 |
| Comp. Ex. 4 | Compound 1 | 100 | | | Compound 27 | 10 | 75 | 8 |
| Comp. Ex. 5 | Compound 1 | 100 | | | Compound 27 | 20 | 74 | 11 |
| Comp. Ex. 6 | Compound 1 | 100 | | | Compound 27 | 25 | 73 | 9 |
| Comp. Ex. 7 | Compound 1 | 100 | | | Compound 27 | 5 | 77 | 5 |
| Comp. Ex. 8 | Compound 2 | 100 | | | Compound 27 | 15 | 76 | 7 |
| Comp. Ex. 9 | Compound 3 | 100 | | | Compound 27 | 15 | 75 | 8 |
| Comp. Ex. 10 | Compound 4 | 100 | | | Compound 27 | 15 | 73 | 6 |
| Comp. Ex. 11 | Compound 5 | 100 | | | Compound 27 | 15 | 76 | 9 |
| Comp. Ex. 12 | Compound 6 | 100 | | | Compound 27 | 15 | 78 | 7 |

TABLE 2-continued

|  | Components | | | | | | Transparency (Total light transmittance) (%) | Tensile Fracture Energy (J) |
|---|---|---|---|---|---|---|---|---|
|  | Cellulose ester resin | | Polyether ester compound | | Other additives | | | |
|  | Kind | Part | Kind | Part | Kind | Part | | |
| Comp. Ex. 13 | Compound 7 | 100 | | | Compound 27 | 15 | 78 | 7 |
| Comp. Ex. 14 | Compound 8 | 100 | | | Compound 27 | 15 | 76 | 8 |

It is apparent from the above results that Examples are superior in both transparency (total light transmittance) and tensile fracture energy to Comparative Examples.

Examples 32 to 70 and Comparative Examples 15 to 21

[Kneading]

Materials having components shown in Tables 3 and 4 are placed in a twin screw kneader (TEX41SS, manufactured by TOSHIBA MACHINE CO., LTD) and kneaded at a cylinder temperature of 220° C. to 250° C. to obtain a pellet of a resin composition (hereinafter, referred to as "resin pellet"). Meanwhile, in Tables 3 and 4, "parts" means "parts by mass".

[Injection Molding]

The obtained pellet is placed in an injection molding machine (PNX 40, manufactured by NISSEI PLASTIC INDUSTRIAL CO., LTD) and injection-molded at a cylinder temperature of 220° C. to 250° C. and a mold temperature of 40° C. to 60° C. to obtain D2 shaped product (length of 60 mm, width 60 mm, and thickness of 2 mm).

[Evaluation]

The obtained D2 specimens are evaluated as follows. The results are shown in Tables 3 and 4.

Water Repellency

A contact angle of hyperpure water on the D2 specimens is measured by using a contact angle measuring apparatus (DM-901, manufactured by Kyowa Interface Science Co., LTD.) to evaluate water repellency.

TABLE 3

|  | Components | | | | | | | | Water repellency (contact angle) (°) |
|---|---|---|---|---|---|---|---|---|---|
|  | Cellulose ester resin | | Polyether ester compound | | ABS resin | | Other additives | | |
|  | Kind | Part | Kind | Part | Kind | Part | Kind | Part | |
| Ex. 32 | Compound 1 | 100 | Compound 9 | 15 | Compound 30 | 5 | | | 91 |
| Ex. 33 | Compound 1 | 100 | Compound 9 | 10 | Compound 30 | 5 | | | 90 |
| Ex. 34 | Compound 1 | 100 | Compound 9 | 20 | Compound 30 | 5 | | | 91 |
| Ex. 35 | Compound 1 | 100 | Compound 9 | 25 | Compound 30 | 5 | | | 93 |
| Ex. 36 | Compound 1 | 100 | Compound 9 | 5 | Compound 30 | 5 | | | 90 |
| Ex. 37 | Compound 1 | 100 | Compound 9 | 27 | Compound 30 | 5 | | | 82 |
| Ex. 38 | Compound 1 | 100 | Compound 9 | 4 | Compound 30 | 5 | | | 80 |
| Ex. 39 | Compound 2 | 100 | Compound 9 | 15 | Compound 30 | 5 | | | 90 |
| Ex. 40 | Compound 3 | 100 | Compound 9 | 15 | Compound 30 | 5 | | | 91 |
| Ex. 41 | Compound 4 | 100 | Compound 9 | 15 | Compound 30 | 5 | | | 85 |
| Ex. 42 | Compound 5 | 100 | Compound 9 | 15 | Compound 30 | 5 | | | 90 |
| Ex. 43 | Compound 6 | 100 | Compound 9 | 15 | Compound 30 | 5 | | | 83 |
| Ex. 44 | Compound 7 | 100 | Compound 9 | 15 | Compound 30 | 5 | | | 86 |
| Ex. 45 | Compound 8 | 100 | Compound 9 | 15 | Compound 30 | 5 | | | 85 |
| Ex. 46 | Compound 1 | 100 | Compound 10 | 15 | Compound 30 | 5 | | | 84 |
| Ex. 47 | Compound 1 | 100 | Compound 11 | 15 | Compound 30 | 5 | | | 86 |
| Ex. 48 | Compound 1 | 100 | Compound 12 | 15 | Compound 30 | 5 | | | 85 |
| Ex. 49 | Compound 1 | 100 | Compound 13 | 15 | Compound 30 | 5 | | | 82 |
| Ex. 50 | Compound 1 | 100 | Compound 14 | 15 | Compound 30 | 5 | | | 85 |
| Ex. 51 | Compound 1 | 100 | Compound 15 | 15 | Compound 30 | 5 | | | 90 |
| Ex. 52 | Compound 1 | 100 | Compound 16 | 15 | Compound 30 | 5 | | | 91 |
| Ex. 53 | Compound 1 | 100 | Compound 17 | 15 | Compound 30 | 5 | | | 84 |
| Ex. 54 | Compound 1 | 100 | Compound 18 | 15 | Compound 30 | 5 | | | 85 |
| Ex. 55 | Compound 1 | 100 | Compound 19 | 15 | Compound 30 | 5 | | | 90 |
| Ex. 56 | Compound 1 | 100 | Compound 20 | 15 | Compound 30 | 5 | | | 91 |
| Ex. 57 | Compound 1 | 100 | Compound 21 | 15 | Compound 30 | 5 | | | 86 |
| Ex. 58 | Compound 1 | 100 | Compound 22 | 15 | Compound 30 | 5 | | | 83 |
| Ex. 59 | Compound 1 | 100 | Compound 23 | 15 | Compound 30 | 5 | | | 91 |
| Ex. 60 | Compound 1 | 100 | Compound 9 | 10 | Compound 30 | 2 | | | 90 |
| Ex. 61 | Compound 1 | 100 | Compound 9 | 10 | Compound 30 | 8 | | | 91 |
| Ex. 62 | Compound 1 | 100 | Compound 9 | 10 | Compound 30 | 1 | | | 86 |
| Ex. 63 | Compound 1 | 100 | Compound 9 | 10 | Compound 30 | 9 | | | 85 |
| Ex. 64 | Compound 1 | 100 | Compound 9 | 10 | Compound 31 | 5 | | | 91 |
| Ex. 65 | Compound 1 | 100 | Compound 9 | 10 | Compound 32 | 5 | | | 87 |
| Ex. 66 | Compound 1 | 100 | Compound 9 | 10 | Compound 33 | 5 | | | 87 |

TABLE 3-continued

| | Components | | | | | | | | Water repellency (contact angle) |
|---|---|---|---|---|---|---|---|---|---|
| | Cellulose ester resin | | Polyether ester compound | | ABS resin | | Other additives | | |
| | Kind | Part | Kind | Part | Kind | Part | Kind | Part | (°) |
| Ex. 67 | Compound 1 | 100 | Compound 9 | 10 | Compound 34 | 5 | | | 92 |
| Ex. 68 | Compound 1 | 100 | Compound 9 | 10 | | | | | 61 |
| Ex. 69 | Compound 1 | 100 | Compound 9 | 25 | | | | | 58 |
| Ex. 70 | Compound 1 | 100 | Compound 9 | 5 | | | | | 62 |

TABLE 4

| | Components | | | | | | | | Water repellency (contact angle) |
|---|---|---|---|---|---|---|---|---|---|
| | Cellulose ester resin | | Polyether ester compound | | ABS resin | | Other additives | | |
| | Kind | Part | Kind | Part | Kind | Part | Kind | Part | (°) |
| Comp. Ex. 15 | Compound 1 | 100 | | | Compound 30 | 5 | Compound 27 | 10 | 55 |
| Comp. Ex. 16 | Compound 1 | 100 | | | Compound 30 | 5 | Compound 27 | 25 | 56 |
| Comp. Ex. 17 | Compound 1 | 100 | | | Compound 30 | 5 | Compound 27 | 5 | 57 |
| Comp. Ex. 18 | Compound 1 | 100 | | | Compound 30 | 2 | Compound 27 | 10 | 56 |
| Comp. Ex. 19 | Compound 2 | 100 | | | Compound 30 | 8 | Compound 27 | 10 | 57 |
| Comp. Ex. 20 | Compound 3 | 100 | | | Compound 30 | 5 | Compound 28 | 10 | 55 |
| Comp. Ex. 21 | Compound 4 | 100 | | | Compound 30 | 5 | Compound 29 | 10 | 56 |

It is apparent from Tables 3 and 4 that Examples are superior in water repellency to Comparative Examples.

Examples 71 to 106 and Comparative Examples 22 to 28

[Kneading]
Materials having components shown in Tables 5 and 6 are placed in a twin screw kneader (TEX41SS, manufactured by TOSHIBA MACHINE CO., LTD) and kneaded at a cylinder temperature of 220° C. to 250° C. to obtain a pellet of a resin composition (hereinafter, referred to as "resin pellet"). Meanwhile, in Tables 5 and 6, "parts" means "parts by mass".

[Injection Molding]
The obtained pellet is placed in an injection molding machine (PNX 40, manufactured by NISSEI PLASTIC INDUSTRIAL CO., LTD) and injection-molded at a cylinder temperature of 220° C. to 250° C. and a mold temperature of 40° C. to 60° C. to obtain D2 shaped product (length of 60 mm, width 60 mm, and thickness of 2 mm).

[Evaluation]
The obtained D2 specimens and the resin pellet are evaluated as follows. The results are shown in Tables 5 and 6.

Moldability
Melt flow rate (MFR, g/10 min) of the resin pellet is measured by using a melt indexer (G-01, manufactured by TOYO SEIKI SEISAKU-SHO, LTD.) at a temperature of 230° C. and a load of 21.2 N to evaluate moldability.

Bleeding Resistance
The D2 specimens are put softly in a thermohygrostat bath set to a temperature of 60° C. and a humidity of 95% RH (ARL-1100-J, manufactured by ESPEC CORP.). After an elapse time of 72 hours, the D2 specimens are taken out from the thermohygrostat bath. A surface of the D2 specimens is observed by visual observation to evaluate bleeding resistance. The criteria of the evaluation are follows.
5: No bleeding in liquid and fogging due to bleeding
4: Generation of fogging due to bleeding in a part of the surface
3: Generation of fogging due to bleeding in the entire surface
2: Generation of bleeding in liquid in a part of the surface
1: Generation of bleeding in liquid in the entire surface

TABLE 5

| | Components | | | | | | | | Moldability (MFR) | Bleeding Resistance |
|---|---|---|---|---|---|---|---|---|---|---|
| | Cellulose ester resin | | Polyether ester compound | | Maleic anhydride-modified EVA resin | | Other additives | | | |
| | Kind | Part | Kind | Part | Kind | Part | Kind | Part | (g/10 min) | Reference |
| Ex. 71 | Compound 1 | 100 | Compound 9 | 15 | Compound 35 | 5 | | | 30 | 5 |
| Ex. 72 | Compound 1 | 100 | Compound 9 | 10 | Compound 35 | 5 | | | 28 | 5 |
| Ex. 73 | Compound 1 | 100 | Compound 9 | 20 | Compound 35 | 5 | | | 35 | 5 |
| Ex. 74 | Compound 1 | 100 | Compound 9 | 25 | Compound 35 | 5 | | | 46 | 5 |
| Ex. 75 | Compound 1 | 100 | Compound 9 | 5 | Compound 35 | 5 | | | 23 | 5 |
| Ex. 76 | Compound 1 | 100 | Compound 9 | 27 | Compound 35 | 5 | | | 55 | 4 |
| Ex. 77 | Compound 1 | 100 | Compound 9 | 4 | Compound 35 | 5 | | | 19 | 4 |
| Ex. 78 | Compound 2 | 100 | Compound 9 | 15 | Compound 35 | 5 | | | 26 | 5 |
| Ex. 79 | Compound 3 | 100 | Compound 9 | 15 | Compound 35 | 5 | | | 28 | 5 |

TABLE 5-continued

| | Cellulose ester resin | | Polyether ester compound | | Maleic anhydride-modified EVA resin | | Other additives | | Moldability (MFR) | Bleeding Resistance |
|---|---|---|---|---|---|---|---|---|---|---|
| | Kind | Part | Kind | Part | Kind | Part | Kind | Part | (g/10 min) | Reference |
| Ex. 80 | Compound 4 | 100 | Compound 9 | 15 | Compound 35 | 5 | | | 19 | 4 |
| Ex. 81 | Compound 5 | 100 | Compound 9 | 15 | Compound 35 | 5 | | | 29 | 5 |
| Ex. 82 | Compound 6 | 100 | Compound 9 | 15 | Compound 35 | 5 | | | 18 | 4 |
| Ex. 83 | Compound 7 | 100 | Compound 9 | 15 | Compound 35 | 5 | | | 18 | 4 |
| Ex. 84 | Compound 8 | 100 | Compound 9 | 15 | Compound 35 | 5 | | | 19 | 4 |
| Ex. 85 | Compound 1 | 100 | Compound 10 | 15 | Compound 35 | 5 | | | 20 | 4 |
| Ex. 86 | Compound 1 | 100 | Compound 11 | 15 | Compound 35 | 5 | | | 18 | 4 |
| Ex. 87 | Compound 1 | 100 | Compound 12 | 15 | Compound 35 | 5 | | | 19 | 4 |
| Ex. 88 | Compound 1 | 100 | Compound 13 | 15 | Compound 35 | 5 | | | 18 | 4 |
| Ex. 89 | Compound 1 | 100 | Compound 14 | 15 | Compound 35 | 5 | | | 19 | 4 |
| Ex. 90 | Compound 1 | 100 | Compound 15 | 15 | Compound 35 | 5 | | | 28 | 5 |
| Ex. 91 | Compound 1 | 100 | Compound 16 | 15 | Compound 35 | 5 | | | 27 | 5 |
| Ex. 92 | Compound 1 | 100 | Compound 17 | 15 | Compound 35 | 5 | | | 18 | 4 |
| Ex. 93 | Compound 1 | 100 | Compound 18 | 15 | Compound 35 | 5 | | | 17 | 4 |
| Ex. 94 | Compound 1 | 100 | Compound 19 | 15 | Compound 35 | 5 | | | 26 | 5 |
| Ex. 95 | Compound 1 | 100 | Compound 20 | 15 | Compound 35 | 5 | | | 27 | 5 |
| Ex. 96 | Compound 1 | 100 | Compound 21 | 15 | Compound 35 | 5 | | | 19 | 4 |
| Ex. 97 | Compound 1 | 100 | Compound 22 | 15 | Compound 35 | 5 | | | 19 | 4 |
| Ex. 98 | Compound 1 | 100 | Compound 23 | 15 | Compound 35 | 5 | | | 29 | 5 |
| Ex. 99 | Compound 1 | 100 | Compound 9 | 10 | Compound 35 | 2 | | | 26 | 5 |
| Ex. 100 | Compound 1 | 100 | Compound 9 | 10 | Compound 35 | 8 | | | 19 | 4 |
| Ex. 101 | Compound 1 | 100 | Compound 9 | 10 | Compound 35 | 1 | | | 19 | 4 |
| Ex. 102 | Compound 1 | 100 | Compound 9 | 10 | Compound 35 | 9 | | | 25 | 5 |
| Ex. 103 | Compound 1 | 100 | Compound 9 | 10 | Compound 36 | 5 | | | 22 | 4 |
| Ex. 104 | Compound 1 | 100 | Compound 9 | 10 | | | | | 20 | 3 |
| Ex. 105 | Compound 1 | 100 | Compound 9 | 25 | | | | | 28 | 2 |
| Ex. 106 | Compound 1 | 100 | Compound 9 | 5 | | | | | 1.5 | 4 |

TABLE 6

| | Cellulose ester resin | | Polyether ester compound | | Maleic anhydride-modified EVA resin | | Other additives | | Moldability (MFR) | Bleeding Resistance |
|---|---|---|---|---|---|---|---|---|---|---|
| | Kind | Part | Kind | Part | Kind | Part | Kind | Part | (g/10 min) | Reference |
| Comp. Ex. 22 | Compound 1 | 100 | | | Compound 35 | 5 | Compound 27 | 10 | 5.5 | 1 |
| Comp. Ex. 23 | Compound 1 | 100 | | | Compound 35 | 5 | Compound 27 | 25 | 20 | 1 |
| Comp. Ex. 24 | Compound 1 | 100 | | | Compound 35 | 5 | Compound 27 | 5 | 0.5 | 1 |
| Comp. Ex. 25 | Compound 1 | 100 | | | Compound 35 | 2 | Compound 27 | 10 | 4.5 | 1 |
| Comp. Ex. 26 | Compound 2 | 100 | | | Compound 35 | 8 | Compound 27 | 10 | 5.5 | 1 |
| Comp. Ex. 27 | Compound 3 | 100 | | | Compound 35 | 5 | Compound 28 | 10 | 4 | 1 |
| Comp. Ex. 28 | Compound 4 | 100 | | | Compound 35 | 5 | Compound 29 | 10 | 4.5 | 1 |

It is apparent from Tables 5 and 6 that Examples are superior in moldability (MFR) and bleeding resistance to Comparative Examples.

Examples 107 to 143 and Comparative Examples 29 to 35

[Kneading]

Materials having components shown in Tables 7 and 8 are placed in a twin screw kneader (TEX41SS, manufactured by TOSHIBA MACHINE CO., LTD) and kneaded at a cylinder temperature of 220° C. to 250° C. to obtain a pellet of a resin composition (hereinafter, referred to as "resin pellet"). Meanwhile, in Tables 7 and 8, "parts" means "parts by mass".

[Injection Molding]

The obtained pellet is placed in an injection molding machine (PNX 40, manufactured by NISSEI PLASTIC INDUSTRIAL CO., LTD) and injection-molded at a cylinder temperature of 220° C. to 250° C. and a mold temperature of 40° C. to 60° C. to obtain D2 shaped product (length of 60 mm, width 60 mm, and thickness of 2 mm).

[Evaluation]

The obtained D2 specimens and the resin pellet are evaluated as follows. The results are shown in Tables 7 and 8.

Moldability

Melt flow rate (MFR, g/10 min) of the resin pellet is measured by using a melt indexer (G-01, manufactured by TOYO SEIKI SEISAKU-SHO, LTD.) at a temperature of 230° C. and a load of 21.2 N to evaluate moldability.

Surface Glossiness

Glossiness of the surface of the D2 specimens are measured by using a gloss checker (IG410, manufactured by HORIBA, Ltd.) to evaluate surface glossiness.

TABLE 7

| | Cellulose ester resin | | Polyether ester compound | | Polyhydroxyalkanoate resin | | Other additives | | Moldability (MFR) | Surface glossiness |
|---|---|---|---|---|---|---|---|---|---|---|
| | Kind | Part | Kind | Part | Kind | Part | Kind | Part | (g/10 min) | (%) |
| Ex. 107 | Compound 1 | 100 | Compound 9 | 15 | Compound 37 | 5 | | | 35.0 | 95 |
| Ex. 108 | Compound 1 | 100 | Compound 9 | 10 | Compound 37 | 5 | | | 38.0 | 95 |
| Ex. 109 | Compound 1 | 100 | Compound 9 | 20 | Compound 37 | 5 | | | 45.0 | 95 |
| Ex. 110 | Compound 1 | 100 | Compound 9 | 25 | Compound 37 | 5 | | | 55.0 | 95 |
| Ex. 111 | Compound 1 | 100 | Compound 9 | 5 | Compound 37 | 5 | | | 39.0 | 95 |
| Ex. 112 | Compound 1 | 100 | Compound 9 | 27 | Compound 37 | 5 | | | 60.0 | 90 |
| Ex. 113 | Compound 1 | 100 | Compound 9 | 4 | Compound 37 | 5 | | | 27.0 | 90 |
| Ex. 114 | Compound 2 | 100 | Compound 9 | 15 | Compound 37 | 5 | | | 36.0 | 95 |
| Ex. 115 | Compound 3 | 100 | Compound 9 | 15 | Compound 37 | 5 | | | 39.0 | 95 |
| Ex. 116 | Compound 4 | 100 | Compound 9 | 15 | Compound 37 | 5 | | | 29.0 | 90 |
| Ex. 117 | Compound 5 | 100 | Compound 9 | 15 | Compound 37 | 5 | | | 45.0 | 95 |
| Ex. 118 | Compound 6 | 100 | Compound 9 | 15 | Compound 37 | 5 | | | 28.0 | 90 |
| Ex. 119 | Compound 7 | 100 | Compound 9 | 15 | Compound 37 | 5 | | | 27.0 | 90 |
| Ex. 120 | Compound 8 | 100 | Compound 9 | 15 | Compound 37 | 5 | | | 24.0 | 90 |
| Ex. 121 | Compound 1 | 100 | Compound 10 | 15 | Compound 37 | 5 | | | 42.0 | 85 |
| Ex. 122 | Compound 1 | 100 | Compound 11 | 15 | Compound 37 | 5 | | | 28.0 | 90 |
| Ex. 123 | Compound 1 | 100 | Compound 12 | 15 | Compound 37 | 5 | | | 28.0 | 90 |
| Ex. 124 | Compound 1 | 100 | Compound 13 | 15 | Compound 37 | 5 | | | 45.0 | 85 |
| Ex. 125 | Compound 1 | 100 | Compound 14 | 15 | Compound 37 | 5 | | | 24.0 | 90 |
| Ex. 126 | Compound 1 | 100 | Compound 15 | 15 | Compound 37 | 5 | | | 34.0 | 95 |
| Ex. 127 | Compound 1 | 100 | Compound 16 | 15 | Compound 37 | 5 | | | 36.0 | 95 |
| Ex. 128 | Compound 1 | 100 | Compound 17 | 15 | Compound 37 | 5 | | | 24.0 | 91 |
| Ex. 129 | Compound 1 | 100 | Compound 18 | 15 | Compound 37 | 5 | | | 26.0 | 90 |
| Ex. 130 | Compound 1 | 100 | Compound 19 | 15 | Compound 37 | 5 | | | 38.0 | 95 |
| Ex. 131 | Compound 1 | 100 | Compound 20 | 15 | Compound 37 | 5 | | | 40.0 | 95 |
| Ex. 132 | Compound 1 | 100 | Compound 21 | 15 | Compound 37 | 5 | | | 26.0 | 90 |
| Ex. 133 | Compound 1 | 100 | Compound 22 | 15 | Compound 37 | 5 | | | 24.0 | 90 |
| Ex. 134 | Compound 1 | 100 | Compound 23 | 15 | Compound 37 | 5 | | | 40.0 | 94 |
| Ex. 135 | Compound 1 | 100 | Compound 9 | 10 | Compound 37 | 2 | | | 35.0 | 95 |
| Ex. 136 | Compound 1 | 100 | Compound 9 | 10 | Compound 37 | 8 | | | 24.0 | 90 |
| Ex. 137 | Compound 1 | 100 | Compound 9 | 10 | Compound 37 | 1 | | | 24.0 | 90 |
| Ex. 138 | Compound 1 | 100 | Compound 9 | 10 | Compound 37 | 9 | | | 29.0 | 95 |
| Ex. 139 | Compound 1 | 100 | Compound 9 | 10 | Compound 38 | 5 | | | 28.0 | 90 |
| Ex. 140 | Compound 1 | 100 | Compound 9 | 10 | Compound 39 | 5 | | | 25.0 | 90 |
| Ex. 141 | Compound 1 | 100 | Compound 9 | 10 | | | | | 20.0 | 85 |
| Ex. 142 | Compound 1 | 100 | Compound 9 | 25 | | | | | 28.0 | 86 |
| Ex. 143 | Compound 1 | 100 | Compound 9 | 5 | | | | | 1.5 | 83 |

TABLE 8

| | Cellulose ester resin | | Polyether ester compound | | Polyhydroxyalkanoate resin | | Other additives | | Moldability (MFR) | Surface glossiness |
|---|---|---|---|---|---|---|---|---|---|---|
| | Kind | Part | Kind | Part | Kind | Part | Kind | Part | (g/10 min) | (%) |
| Comp. Ex. 29 | Compound 1 | 100 | | | Compound 37 | 5 | Compound 27 | 10 | 7.5 | 80 |
| Comp. Ex. 30 | Compound 1 | 100 | | | Compound 37 | 5 | Compound 27 | 25 | 26.0 | 80 |
| Comp. Ex. 31 | Compound 1 | 100 | | | Compound 37 | 5 | Compound 27 | 5 | 2.5 | 81 |
| Comp. Ex. 32 | Compound 1 | 100 | | | Compound 37 | 2 | Compound 27 | 10 | 6.5 | 80 |
| Comp. Ex. 33 | Compound 2 | 100 | | | Compound 37 | 8 | Compound 27 | 10 | 7.5 | 79 |
| Comp. Ex. 34 | Compound 3 | 100 | | | Compound 37 | 5 | Compound 28 | 10 | 6.5 | 80 |
| Comp. Ex. 35 | Compound 4 | 100 | | | Compound 37 | 5 | Compound 29 | 10 | 7.0 | 81 |

It is apparent from Tables 7 and 8 that Examples are superior in moldability (MFR) and surface glossiness to Comparative Examples.

Examples 144 to 180 and Comparative Examples 36 to 42

[Kneading]
Materials having components shown in Tables 9 and 10 are placed in a twin screw kneader (TEX41SS, manufactured by TOSHIBA MACHINE CO., LTD) and kneaded at a cylinder temperature of 220° C. to 250° C. to obtain a pellet of a resin composition (hereinafter, referred to as "resin pellet"). Meanwhile, in Tables 9 and 10, "parts" means "parts by mass".

[Injection Molding]
The obtained pellet is placed in an injection molding machine (PNX 40, manufactured by NISSEI PLASTIC INDUSTRIAL CO., LTD) and injection-molded at a cylinder temperature of 220° C. to 250° C. and a mold temperature of 40° C. to 60° C. to obtain D2 shaped product (length of 60 mm, width 60 mm, and thickness of 2 mm).

[Evaluation]
Creaking noise at molding is evaluated, and the obtained D2 specimens are evaluated in steel ball drop strength as follows. The results are shown in Tables 9 and 10.

Creaking Noise at Molding

Creaking noise at molding is evaluated a criteria whether strange noise is generated from the screw of the injection molding machine or not.

Steel Ball Drop Strength

A steel ball having a weigh of 500 g is dropped on the D2 specimens to crash the D2 specimens through a pipe made from vinyl chloride. A height when the D2 specimens are cracked is recorded as steel ball drop strength.

It is apparent from Tables 9 and 10 that Examples are superior in creaking noise at molding and steel ball drop strength to Comparative Examples.

The kinds of the materials shown in Tables 1 to 10 are as follows.

Compounds 1 to 8: See the specific examples of the cellulose ester resin

Compounds 9 to 26: See the specific examples of the polyether ester compound

TABLE 9

|  | Components |  |  |  |  |  |  |  | Creaking noise at molding | Steel ball drop strength height |
|---|---|---|---|---|---|---|---|---|---|---|
|  | Cellulose ester resin |  | Polyether ester compound |  | Polyolefin resin |  | Other additives |  |  |  |
|  | Kind | Part | Kind | Part | Kind | Part | Kind | Part |  |  |
| Ex. 144 | Compound 1 | 100 | Compound 9 | 15 | Compound 40 | 5 |  |  | None | 1000 |
| Ex. 145 | Compound 1 | 100 | Compound 9 | 10 | Compound 40 | 5 |  |  | None | 1000 |
| Ex. 146 | Compound 1 | 100 | Compound 9 | 20 | Compound 40 | 5 |  |  | None | 1000 |
| Ex. 147 | Compound 1 | 100 | Compound 9 | 25 | Compound 40 | 5 |  |  | None | 1000 |
| Ex. 148 | Compound 1 | 100 | Compound 9 | 5 | Compound 40 | 5 |  |  | None | 1000 |
| Ex. 149 | Compound 1 | 100 | Compound 9 | 27 | Compound 40 | 5 |  |  | None | 800 |
| Ex. 150 | Compound 1 | 100 | Compound 9 | 4 | Compound 40 | 5 |  |  | None | 800 |
| Ex. 151 | Compound 2 | 100 | Compound 9 | 15 | Compound 40 | 5 |  |  | None | 1000 |
| Ex. 152 | Compound 3 | 100 | Compound 9 | 15 | Compound 40 | 5 |  |  | None | 1000 |
| Ex. 153 | Compound 4 | 100 | Compound 9 | 15 | Compound 40 | 5 |  |  | None | 800 |
| Ex. 154 | Compound 5 | 100 | Compound 9 | 15 | Compound 40 | 5 |  |  | None | 1000 |
| Ex. 155 | Compound 6 | 100 | Compound 9 | 15 | Compound 40 | 5 |  |  | None | 800 |
| Ex. 156 | Compound 7 | 100 | Compound 9 | 15 | Compound 40 | 5 |  |  | None | 800 |
| Ex. 157 | Compound 8 | 100 | Compound 9 | 15 | Compound 40 | 5 |  |  | None | 800 |
| Ex. 158 | Compound 1 | 100 | Compound 10 | 15 | Compound 40 | 5 |  |  | None | 800 |
| Ex. 159 | Compound 1 | 100 | Compound 11 | 15 | Compound 40 | 5 |  |  | None | 800 |
| Ex. 160 | Compound 1 | 100 | Compound 12 | 15 | Compound 40 | 5 |  |  | None | 800 |
| Ex. 161 | Compound 1 | 100 | Compound 13 | 15 | Compound 40 | 5 |  |  | None | 800 |
| Ex. 162 | Compound 1 | 100 | Compound 14 | 15 | Compound 40 | 5 |  |  | None | 800 |
| Ex. 163 | Compound 1 | 100 | Compound 15 | 15 | Compound 40 | 5 |  |  | None | 1000 |
| Ex. 164 | Compound 1 | 100 | Compound 16 | 15 | Compound 40 | 5 |  |  | None | 1000 |
| Ex. 165 | Compound 1 | 100 | Compound 17 | 15 | Compound 40 | 5 |  |  | None | 800 |
| Ex. 166 | Compound 1 | 100 | Compound 18 | 15 | Compound 40 | 5 |  |  | None | 800 |
| Ex. 167 | Compound 1 | 100 | Compound 19 | 15 | Compound 40 | 5 |  |  | None | 1000 |
| Ex. 168 | Compound 1 | 100 | Compound 20 | 15 | Compound 40 | 5 |  |  | None | 1000 |
| Ex. 169 | Compound 1 | 100 | Compound 21 | 15 | Compound 40 | 5 |  |  | None | 800 |
| Ex. 170 | Compound 1 | 100 | Compound 22 | 15 | Compound 40 | 5 |  |  | None | 800 |
| Ex. 171 | Compound 1 | 100 | Compound 23 | 15 | Compound 40 | 5 |  |  | None | 1000 |
| Ex. 172 | Compound 1 | 100 | Compound 9 | 10 | Compound 40 | 2 |  |  | None | 1000 |
| Ex. 173 | Compound 1 | 100 | Compound 9 | 10 | Compound 40 | 8 |  |  | None | 800 |
| Ex. 174 | Compound 1 | 100 | Compound 9 | 10 | Compound 40 | 1 |  |  | None | 800 |
| Ex. 175 | Compound 1 | 100 | Compound 9 | 10 | Compound 40 | 9 |  |  | None | 800 |
| Ex. 176 | Compound 1 | 100 | Compound 9 | 10 | Compound 41 | 5 |  |  | None | 800 |
| Ex. 177 | Compound 1 | 100 | Compound 9 | 10 | Compound 42 | 5 |  |  | None | 800 |
| Ex. 178 | Compound 1 | 100 | Compound 9 | 10 |  |  |  |  | Generation | 200 |
| Ex. 179 | Compound 1 | 100 | Compound 9 | 25 |  |  |  |  | Generation | 200 |
| Ex. 180 | Compound 1 | 100 | Compound 9 | 5 |  |  |  |  | Generation | 200 |

TABLE 10

|  | Components |  |  |  |  |  |  |  | Creaking noise at molding | Steel ball drop strength Height (mm) |
|---|---|---|---|---|---|---|---|---|---|---|
|  | Cellulose ester resin |  | Polyether ester compound |  | Polyolefin resin |  | Other additives |  |  |  |
|  | Kind | Part | Height (mm) | Part | Kind | Part | Kind | Part |  |  |
| Comp. Ex. 36 | Compound 1 | 100 |  |  | Compound 40 | 5 | Compound 27 | 10 | Generation | 200 |
| Comp. Ex. 37 | Compound 1 | 100 |  |  | Compound 40 | 5 | Compound 27 | 25 | Generation | 200 |
| Comp. Ex. 38 | Compound 1 | 100 |  |  | Compound 40 | 5 | Compound 27 | 5 | Generation | 200 |
| Comp. Ex. 39 | Compound 1 | 100 |  |  | Compound 40 | 2 | Compound 27 | 10 | Generation | 200 |
| Comp. Ex. 40 | Compound 2 | 100 |  |  | Compound 40 | 8 | Compound 27 | 10 | Generation | 200 |
| Comp. Ex. 41 | Compound 3 | 100 |  |  | Compound 40 | 5 | Compound 28 | 10 | Generation | 200 |
| Comp. Ex. 42 | Compound 4 | 100 |  |  | Compound 40 | 5 | Compound 29 | 10 | Generation | 200 |

Compound 27: Compound represented by formula (C1)

Compound 28: Compound represented by formula (C2)

Compound 29: Triphenyl phosphate (TPP, manufactured by DAIHACHI CHEMICAL INDUSTRY CO., LTD.)

Compounds 30 to 34: See the specific examples of the ABS resin

Compounds 35 to 36: See the specific examples of the maleic anhydride-modified EVA resin Compounds 37 to 39: See the specific examples of the polyhydroxyalkanoate resin Compounds 40 to 42: See the specific examples of the polyolefin resin

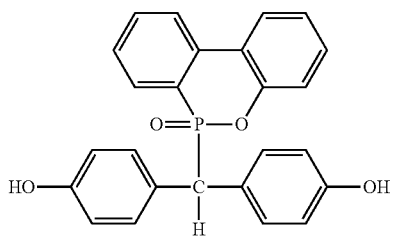

(C1)

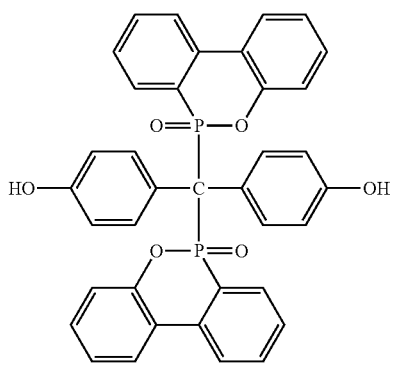

(C2)

The foregoing description of the exemplary embodiments of the present invention has been provided for the purpose of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and there equivalents.

What is claimed is:

1. A resin composition, comprising:
a cellulose ester resin; and
a polyether ester compound,
wherein the polyether ester compound has a viscosity at 25° C. of 35 mPa·s to 50 mPa·s.

2. The resin composition according to claim 1,
wherein the cellulose ester resin is represented by formula (1):

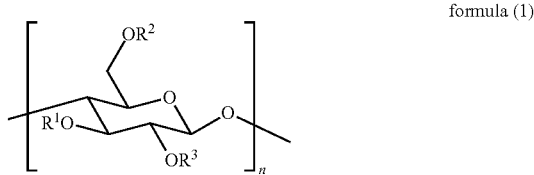

formula (1)

wherein $R^1$, $R^2$ and $R^3$ each independently represent a hydrogen atom or an acyl group having 1 to 3 carbon atoms, and
n represents an integer of 1 or more.

3. The resin composition according to claim 2,
wherein the cellulose ester resin represented by formula (1) has an acetyl group as the acyl group each independently represented by $R^1$, $R^2$ and $R^3$, and
a substitution degree of acetyl group is 2.1 to 2.6.

4. The resin composition according to claim 1,
wherein the polyether ester compound is represented by formula (2):

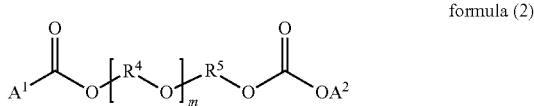

formula (2)

wherein $R^4$ and $R^5$ each independently represent an alkylene group having 2 to 10 carbon atoms,
$A^1$ and $A^2$ each independently represent an alkyl group having 1 to 6 carbon atoms, an aryl group having 6 to 12 carbon atoms, or aralkyl group having 7 to 18 carbon atoms, and
m represents an integer of 1 or more.

5. The resin composition according to claim 4,
wherein $R^5$ is a n-butylene group.

6. The resin composition according to claim 4,
wherein at least one of $A^1$ and $A^2$ represent an aryl group or an aralkyl group.

7. The resin composition according to claim 1,
wherein a weight average molecular weight (Mw) of the polyether ester compound is 450 to 650.

8. A resin composition, comprising:
a cellulose ester resin; and
a polyether ester compound,
wherein the polyether ester compound has a Hazen color number (APHA) of 100 to 140.

9. A resin composition, comprising:
a cellulose ester resin; and
a polyether ester compound,
wherein the polyether ester compound has a solubility parameter (SP value) of 9.5 to 9.9.

10. The resin composition according to claim 1,
wherein a mass ratio of the cellulose ester resin to the polyether ester compound is 100/25 to 100/5.

11. The resin composition according to claim 1, further comprising a maleic anhydride-modified ethylene-vinyl acetate copolymer.

12. The resin composition according to claim 11,
wherein a mass ratio of the cellulose ester resin to the maleic anhydride-modified ethylene-vinyl acetate copolymer is 100/8 to 100/2.

13. The resin composition according to claim 1, further comprising an acrylonitrile-butadiene-styrene copolymer.

14. The resin composition according to claim 13,
wherein a mass ratio of the cellulose ester resin to the acrylonitrile-butadiene-styrene copolymer is 100/8 to 100/2.

15. The resin composition according to claim 1, further comprising a polyhydroxyalkanoate resin.

16. The resin composition according to claim 15,
wherein the polyhydroxyalkanoate resin is represented by formula (3):

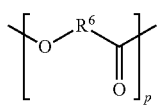

formula (3)

wherein $R^6$ represents an alkylene group having 1 to 10 carbon atoms, and
p represents an integer of 1 or more.

17. The resin composition according to claim 15,
wherein the polyhydroxyalkanoate resin is a copolymer of 3-hydroxyl butylate and 3-hydroxy hexanoate.

18. The resin composition according to claim 15,
wherein a mass ratio of the cellulose ester resin to the polyhydroxyalkanoate resin is 100/8 to 100/2.

19. The resin composition according to claim 1, further comprising a polyolefin resin.

20. The resin composition according to claim 19,
wherein a weight average molecular weight of the polyolefin resin is 20,000 or more and less than 50,000.

21. The resin composition according to claim 19,
wherein a mass ratio of the cellulose ester resin to the polyolefin resin is 100/8 to 100/2.

22. A resin shaped product comprising the resin composition according to claim 1.

23. The resin composition according to claim 8,
wherein the cellulose ester resin is represented by formula (1):

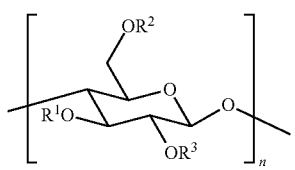

formula (1)

wherein $R^1$, $R^2$ and $R^3$ each independently represent a hydrogen atom or an acyl group having 1 to 3 carbon atoms, and
n represents an integer of 1 or more.

24. The resin composition according to claim 23,
wherein the cellulose ester resin represented by formula (1) has an acetyl group as the acyl group each independently represented by $R^1$, $R^2$ and $R^3$, and
a substitution degree of acetyl group is 2.1 to 2.6.

25. The resin composition according to claim 8,
wherein the polyether ester compound is represented by formula (2):

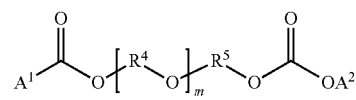

formula (2)

wherein $R^4$ and $R^5$ each independently represent an alkylene group having 2 to 10 carbon atoms,
$A^1$ and $A^2$ each independently represent an alkyl group having 1 to 6 carbon atoms, an aryl group having 6 to 12 carbon atoms, or aralkyl group having 7 to 18 carbon atoms, and
m represents an integer of 1 or more.

26. The resin composition according to claim 25,
wherein $R^5$ is a n-butylene group.

27. The resin composition according to claim 25,
wherein at least one of $A^1$ and $A^2$ represent an aryl group or an aralkyl group.

28. The resin composition according to claim 8,
wherein a weight average molecular weight (Mw) of the polyether ester compound is 450 to 650.

29. The resin composition according to claim 8,
wherein a mass ratio of the cellulose ester resin to the polyether ester compound is 100/25 to 100/5.

30. A resin shaped product comprising the resin composition according to claim 8.

31. The resin composition according to claim 9,
wherein the cellulose ester resin is represented by formula (1):

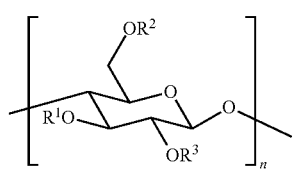

formula (1)

wherein $R^1$, $R^2$ and $R^3$ each independently represent a hydrogen atom or an acyl group having 1 to 3 carbon atoms, and
n represents an integer of 1 or more.

32. The resin composition according to claim 31,
wherein the cellulose ester resin represented by formula (1) has an acetyl group as the acyl group each independently represented by $R^1$, $R^2$ and $R^3$, and
a substitution degree of acetyl group is 2.1 to 2.6.

33. The resin composition according to claim 9,
wherein the polyether ester compound is represented by formula (2):

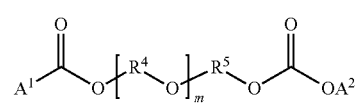

formula (2)

wherein $R^4$ and $R^5$ each independently represent an alkylene group having 2 to 10 carbon atoms, $A^1$ and $A^2$ each independently represent an alkyl group having 1 to 6 carbon atoms, an aryl group having 6 to 12 carbon atoms, or aralkyl group having 7 to 18 carbon atoms, and m represents an integer of 1 or more.

34. The resin composition according to claim 33, wherein $R^5$ is a n-butylene group.

35. The resin composition according to claim 33, wherein at least one of $A^1$ and $A^2$ represent an aryl group or an aralkyl group.

36. The resin composition according to claim 9, wherein a weight average molecular weight (Mw) of the polyether ester compound is 450 to 650.

37. The resin composition according to claim 9, wherein a mass ratio of the cellulose ester resin to the polyether ester compound is 100/25 to 100/5.

38. A resin shaped product comprising the resin composition according to claim 9.

* * * * *